United States Patent
Loftus

[15] 3,665,782
[45] May 30, 1972

[54] NUT SUPPORT TO ACCOMODATE MISALIGNMENT

[72] Inventor: Robert M. Loftus, Farmington, Conn.
[73] Assignee: The Superior Electric Company, Bristol, Conn.
[22] Filed: Sept. 4, 1970
[21] Appl. No.: 69,792

[52] U.S. Cl. ........................................................ 74/424.8 R
[51] Int. Cl. ........................................ F16h 1/18, F16h 55/22
[58] Field of Search ........................................ 74/424.8, 459

[56] References Cited

UNITED STATES PATENTS 3,339,892   9/1967   Dixon .............................. 74/424.8 X
3,468,401   9/1969   Letz ................................. 74/424.8 X

FOREIGN PATENTS OR APPLICATIONS 876,313   8/1961   Great Britain .......................... 74/459
247,730   11/1969   U.S.S.R. .................................. 74/459

Primary Examiner—Leonard H. Gerin
Attorney—Johnson & Kline

[57] ABSTRACT

A support for containing a nut operating on a rotating threaded shaft where the nut is connected to a part mounted for linear movement essentially along the axis of the shaft and in which the support between the nut and the part accommodates misalignment between the shaft and the part without introducing dimensional error along the axis of the shaft.

8 Claims, 4 Drawing Figures

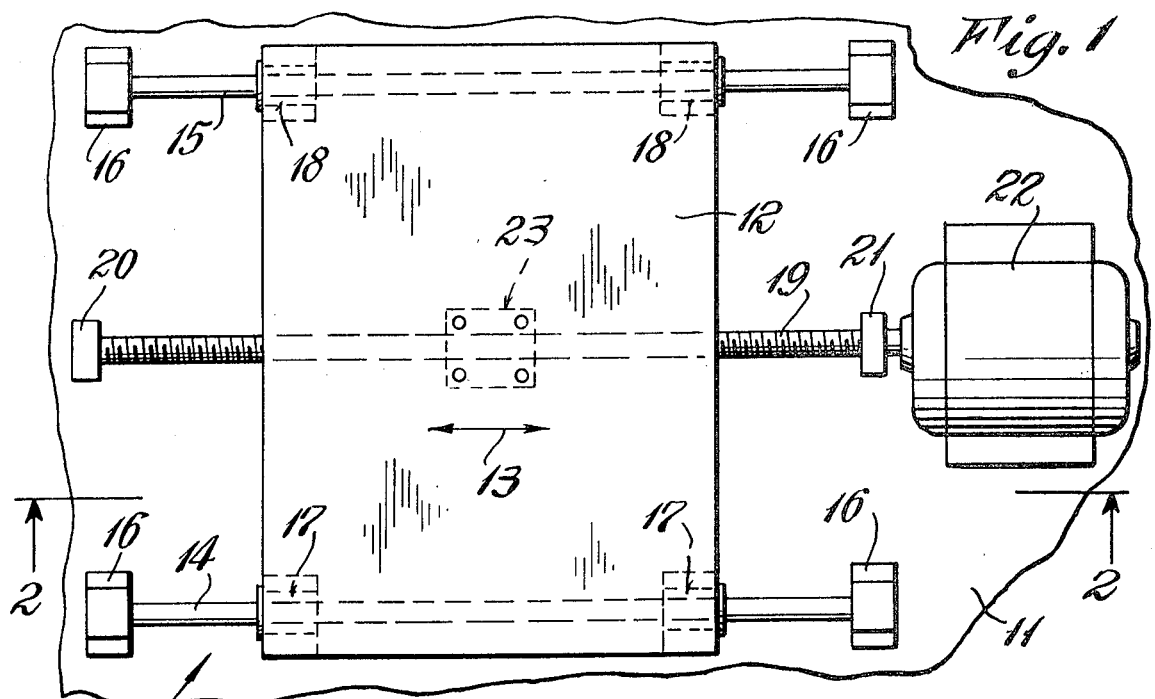
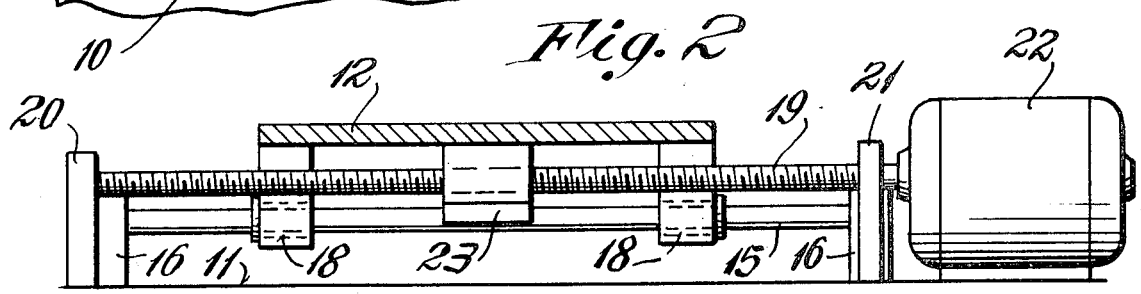
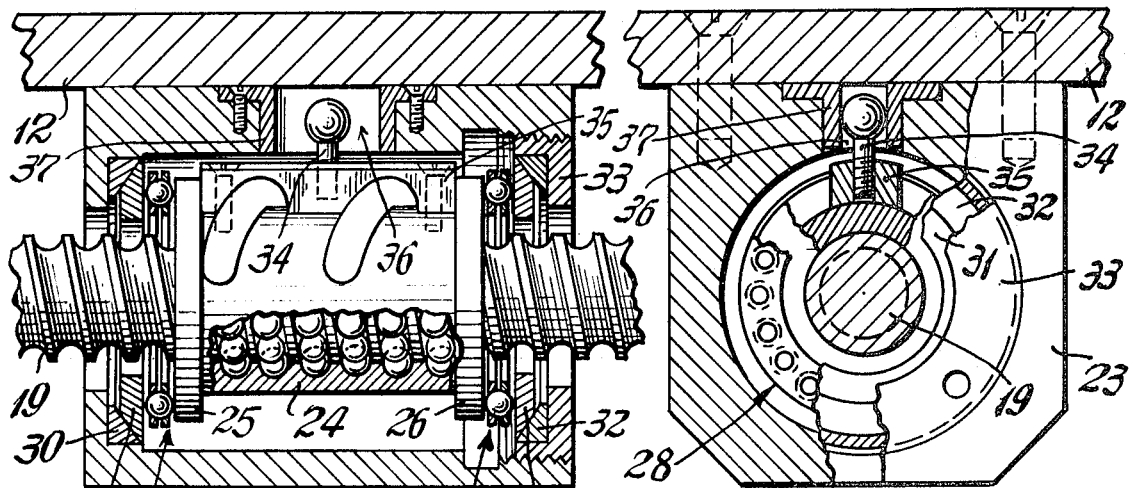

NUT SUPPORT TO ACCOMODATE MISALIGNMENT

In many machine applications, it has been found desirable to move a part such as a work table linearly along an axis by the rotation of the shaft either manually or automatically. Normally the shaft is threaded and the work table carries a cooperating nut such that the nut translates the pitch of the thread into linear movement of the part. In order to prevent binding between the work table guideways and the shaft, it is essential that the axis of the shaft be in alignment with the movement of the part. However, this has been found quite difficult, especially when the length of the shaft which sets the extent of movement is quite long, such as a few feet.

It is accordingly an object of the present invention to provide a support for a nut which is capable of adjusting itself to misalignment between the linear movement of a work table or part and the axis of a driving, threaded shaft connected to move the part upon rotation of the shaft.

Another object of the present invention is to achieve the above object without loss of movement between the nut and the shaft along the axis of the shaft to thereby maintain an accurate relationship between the rotational movement of the shaft and the linear movement of the part.

A further object of the present invention is to provide a nut support which is economical to manufacture, reliable in use, and capable of being easily incorporated into machines having work tables operated by rotation of threaded shafts.

In carrying out the present invention, there is provided a machine having a part such as a work table that is mounted on guideways for accurate movement linearly along an axis. A threaded shaft is mounted to have its axis essentially in alignment with the work table movement, while a nut mounted on the part threadingly cooperates with the shaft so that rotation of the shaft is translated into linear movement of the part. The shaft is mounted on spaced bearings and may be rotated either manually or automatically.

Connected to the part is a housing which contains the nut, and the shaft passes through the nut and housing. A first nut containing means in the housing enables the nut to move on the shaft with respect to the housing, only in a plane that is perpendicular to the axis of the shaft and thereby accommodates for deviation between the shaft and the part in directions perpendicular to the axis of the shaft. A second nut containing means is also positioned in the housing and it permits the axis of the nut to move slightly angularly with respect to the movement of the part and thereby accommodates angular misalignment between the shaft axis and the part movement. However, both nut containing means, while permitting relative movement of the nut within the housing with respect to the part, prevents the nut from moving in a direction along the axis of the shaft, thereby maintaining accuracy between shaft rotation and linear movement of the part.

Other features and advantages will hereinafter appear.

Referring to the drawing:

FIG. 1 is a plan of a machine in which the present invention is incorporated.

FIG. 2 is a section taken on the line 2—2 of FIG. 1.

FIG. 3 is a cross-section somewhat enlarged of the nut support of the present invention.

FIG. 4 is an end view thereof partly in section.

Referring to the drawing, the machine in which the present invention is incorporated is generally indicated by the reference numeral 10 and includes a base 11 on which a part such as a work table 12 is mounted for linear movement in the direction indicated by the double headed arrow 13. While the table 12 may be supported for linear movement in any desired manner in the particular embodiment shown, the support consists of a pair of parallel rods 14 and 15 supported on blocks 16 that are fastened on the base and which extend through pairs of bearing blocks 17 and 18 secured on the work table. The bearing blocks may be provided with linear bushings if desired.

In order to regulate the extent of movement of the table 12, there is provided a threaded shaft 19 having an axis extending substantially parallel to the arrow 13 and which has its ends supported in bearings 20 and 21. Also in the embodiment shown, though the shaft may be rotated manually, it is herein disclosed as being connected to a motor 22 which may be automatically controlled.

On the undersurface of the table 12, a housing 23 is secured, and in which a nut 24 is contained. Accordingly, rotation of the shaft 19 will be translated into a linear movement of the table 12.

While the shaft 19 should be aligned with the arrow 13 and in a plane parallel to the table, it has been found extremely difficult when making such a machine to achieve such alignment to prevent binding between the nut and the shaft, while also maintaining preciseness and accuracy therebetween. The present invention, however, provides for supporting the nut in the housing 23 in such a manner that the nut can accommodate some misalignment of the shaft 19, but yet prevent loss of translation between the rotational movement of the shaft and the linear movement of the part 12. Accordingly, referring to FIG. 3, the nut 24 is elongate and has secured on each end thereof flanges 25 and 26. Rolling on the outer edge of the flanges are the balls of cylindrical roller thrust bearings 27 and 28. These bearings constitute a first nut containing means and enable the nut to move essentially in any direction perpendicular to the axis of the shaft.

The balls of the roller thrust bearing 27 also bear against one part 29 of a spherical bearing seat having a stationary part 30, while the bearing 28 also bears against a part 31 of an identical spherical bearing seat having a stationary part 32. The housing includes a cap 33 which is threadingly positioned within the end of the housing and enables the heretofore mentioned parts to be assembled within the housing. It will also be noted that, as the cap 33 is screwed into the housing, it serves to compress the parts together to prevent looseness between the nut, the thrust bearings, the spherical bearing seats, and the housing along the direction of the axis of the shaft.

In use, the parts are assembled as shown with the shaft 19 extending through the housing and the nut 24 threadingly cooperating therewith. If misalignment between the nut and the shaft occurs perpendicular to the direction of the arrow 13, the nut 24 will move to accommodate the misalignment by rolling on the balls of the roller thrust bearings 27 and 28. However, this movement, by being only perpendicular to the arrow 13, does not introduce any error into the position of the part 12 along the axis of the shaft 19.

Additionally, if the axis of the shaft 19 should be slightly angular with respect to the arrow 13, then the nut pivots or tilts to align itself with the axis of the shaft, with the tilting being absorbed by the parts 29 and 31 arcuately moving with respect to the parts 30 and 32, respectively. As the degree of angular misalignment to be accommodated is only relatively small, but without the present invention would effect binding of the various parts, the relative tilting of the nut 24 does not introduce any significant error into the movement of the part 12 by the shaft 19.

In the specific embodiment, the nut travels or moves, while the shaft only rotates. It is within the scope of the present invention to maintain the nut stationary and have the shaft rotate if desired.

While the nut has been shown as a ball nut, it will be understood that the present invention is also usable with nuts and shafts having an Acme or other thread. The nut, flanges 25 and 26, thrust bearings 27 and 28, and spherical seats are commercially available parts, which renders the nut support substantially economical to manufacture.

The nut 24 is maintained against turning with respect to the housing 23 by having a spherical head pin 34 threaded into the nut return cover 35 at approximately the mid-point of the nut. The head is contained within a pocket 36 formed in a member 37 made fast to the housing 23. The pocket is rectangular in shape to accommodate tilting and/or perpendicular movement of the pin (FIG. 3) while closely containing the head to prevent any rotational movement with respect to the housing (FIG. 4).

It will accordingly be appreciated that there has been disclosed a support for a nut that is usable with a part that is mounted for linear movement with the extent of movement being controlled by rotation of a threaded shaft that cooperates with the nut. For accommodating misalignment between the axis of the shaft and the direction of movement, the present invention provides for mounting the nut on the movable part by a first nut containing means which permits the nut to have free movement perpendicular to the axis of the shaft and a second nut containing means which enables the nut to tilt slightly with respect to the part 12 in order to accommodate angularity between the axis of the shaft and the direction of movement. However, both nut containing means, while permitting the nut to accommodate for misalignment, contain the nut in such a manner that the nut does not move along the axis of the shaft and hence maintains the preciseness of shaft rotation and part movement which is required in precise machinery.

Variations and modifications may be made within the scope of the claims and portions of the improvements may be used without others.

I claim:

1. A support for a nut relatively movable in a linear direction and which cooperates with a threaded shaft with the support accommodating misalignment between the direction and the shaft comprising a housing adapted to be mounted on a part mounted for relative linear movement with respect to the shaft and movable with the part, a threaded shaft having an axis extending essentially parallel with the direction of movement, an elongate threaded nut positioned within the housing and adapted to threadingly cooperate with the threaded shaft, first nut containing means for containing the nut within the housing and for enabling relative movement of the nut in the housing essentially perpendicular to the axis of the shaft and second nut containing means for containing the nut within the housing and for enabling relative angular movement of the nut with respect to the housing.

2. The invention as defined in claim 1 in which the housing has ends having appertures through which the shaft passes, the nut is positioned between the ends and each nut containing means has two portions with a portion of each located between the nut and each end.

3. The invention as defined in claim 2 in which one end of the housing is mounted for movement with respect to the other end along the axis of the nut and in which the one end axially retains the nut and both nut containing means against the ends of the housing.

4. The invention as defined in claim 1 in which the first nut containing means includes at least at one end of the nut a pair of parallel surfaces perpendicular to the axis of the nut and movable bearing means mounted between the surfaces to enable relative movement therebetween.

5. The invention as defined in claim 4 in which the nut has a flange having an outer surface forming one of the parallel surfaces, the other surface is formed by the second nut containing means and in which the movable bearing means includes a plurality of caged balls.

6. The invention as defined in claim 1 in which the second nut containing means includes a portion having two parts, said parts being arranged to be pivotable with respect to each other to form a spherical bearing means.

7. The invention as defined in claim 6 in which one part is maintained stationary with respect to the housing and in which the other part pivots to become aligned with the axis of the shaft.

8. The invention as defined in claim 7 in which the other part has a flat surface that is perpendicular to the axis of the nut, in which the nut has an adjacent flat surface parallel to the flat surface and in which bearing means are positioned between the two surfaces with the bearing means and surfaces constituting the first nut containing means.

* * * * *